United States Patent
Nohara et al.

(10) Patent No.: US 11,619,208 B2
(45) Date of Patent: Apr. 4, 2023

(54) WIND TURBINE DRIVE SYSTEM AND WIND TURBINE

(71) Applicant: NABTESCO CORPORATION, Tokyo (JP)

(72) Inventors: Osamu Nohara, Gifu (JP); Haruna Osako, Gifu (JP)

(73) Assignee: NABTESCO CORPORATION, Tokyo (JP)

(*) Notice: Subject to any disclaimer, the term of this patent is extended or adjusted under 35 U.S.C. 154(b) by 145 days.

(21) Appl. No.: 16/314,480

(22) PCT Filed: Jul. 7, 2017

(86) PCT No.: PCT/JP2017/025028
§ 371 (c)(1),
(2) Date: Mar. 7, 2019

(87) PCT Pub. No.: WO2018/008754
PCT Pub. Date: Jan. 11, 2018

(65) Prior Publication Data
US 2019/0186468 A1 Jun. 20, 2019

(30) Foreign Application Priority Data
Jul. 8, 2016 (JP) .............................. JP2016-135953

(51) Int. Cl.
*F03D 15/00* (2016.01)
*F16H 1/22* (2006.01)
(Continued)

(52) U.S. Cl.
CPC ........... *F03D 15/00* (2016.05); *F03D 7/0204* (2013.01); *F03D 7/0224* (2013.01); *F03D 7/04* (2013.01);
(Continued)

(58) Field of Classification Search
CPC ...... F03D 15/00; F03D 7/0204; F03D 7/0224; F03D 7/04
See application file for complete search history.

(56) References Cited

U.S. PATENT DOCUMENTS

2010/0014969 A1* 1/2010 Wilson .................. F03D 7/0224
416/1
2011/0318178 A1* 12/2011 Andersen .............. F03D 7/0204
416/1
(Continued)

FOREIGN PATENT DOCUMENTS

| CN | 102312780 A | 1/2012 |
| CN | 104153949 A | 11/2014 |

(Continued)

OTHER PUBLICATIONS

Extended European Search Report EP Application No. 17824357.2 dated Jun. 25, 2019.
(Continued)

*Primary Examiner* — Sean Gugger
(74) *Attorney, Agent, or Firm* — Pillsbury Winthrop Shaw Pittman, LLP

(57) ABSTRACT

A wind turbine drive system includes a plurality of drive devices, a state quantity detection unit, and a control unit. The plurality of drive devices are provided in a first structure (a nacelle), and a ring gear is provided in a second structure (a tower). Each of the drive devices includes a motor drive portion, a speed reducing portion, and a motor braking portion for braking the motor drive portion. The state quantity detection unit detects a load between a meshing portion of each of the drive devices and the ring gear. Based on the thus detected load for the each of the drive devices, the control unit controls at least one of the motor drive
(Continued)

portion and the motor braking portion so as to reduce a degree of variation in the load among the drive devices.

9 Claims, 10 Drawing Sheets

(51) Int. Cl.
  *F03D 7/02* (2006.01)
  *F03D 7/04* (2006.01)
(52) U.S. Cl.
  CPC ...... *F16H 1/22* (2013.01); *F05B 2260/40311* (2013.01); *F05B 2270/1013* (2013.01); *F05B 2270/1032* (2013.01); *F05B 2270/1075* (2013.01); *F05B 2270/331* (2013.01); *Y02E 10/72* (2013.01)

(56) References Cited

U.S. PATENT DOCUMENTS

| 2013/0088009 | A1  | 4/2013  | Cousineau et al. |
| 2013/0115043 | A1* | 5/2013  | Rosenvard ............ F03D 7/0204 415/1 |
| 2013/0127272 | A1* | 5/2013  | Kodama .................. F03D 7/04 310/83 |
| 2015/0275858 | A1* | 10/2015 | Frederiksen ............ F03D 13/22 415/1 |
| 2016/0131106 | A1  | 5/2016  | Janben et al. |
| 2019/0203697 | A1  | 7/2019  | Nohara et al. |

FOREIGN PATENT DOCUMENTS

| EP | 2402597 A1    | 1/2012  |
| EP | 2574782 A2    | 4/2013  |
| EP | 3232054 A1    | 10/2017 |
| JP | 2011-127551 A | 6/2011  |
| JP | 2012-013085 A | 1/2012  |
| JP | 2015-521711 A | 7/2015  |
| JP | 2015-140777 A | 8/2015  |
| JP | 2015-533999 A | 11/2015 |
| WO | 2009/150715 A1 | 12/2009 |
| WO | 2016/181729 A1 | 11/2016 |

OTHER PUBLICATIONS

Office Action dated Jan. 21, 2020 issued in corresponding Chinese Patent Application No. 201780042584.0 with English translation (16 pages).

International Search Report PCT/JP2017/025028 dated Sep. 19, 2017 with English translation.

English translation International Preliminary Report on Patentability and Written Opinion of the International Searching Authority PCT/JP2017/025028 dated Jan. 8, 2019.

Non-Final Office Action dated Apr. 28, 2020 issued in corresponding U.S. Appl. No. 16/314,484.

* cited by examiner

WIND TURBINE DRIVE SYSTEM AND WIND TURBINE

CROSS-REFERENCE TO RELATED APPLICATIONS

This Application is the U.S. National Stage of PCT/JP2017/025028, filed Jul. 7, 2017, which claims priority to Japanese Patent Application No. 2016-135953 filed Jul. 8, 2016. The contents of each of which is incorporated herein by reference in entirety.

TECHNICAL FIELD

The present invention relates to a wind turbine drive system and a wind turbine that are configured to drive a ring gear by use of a plurality of drive devices.

BACKGROUND

In a wind turbine used in a wind power generator or the like, generally, pitch control and yaw control are performed so that blades rotate efficiently. In the pitch control, an angle of each of the blades with respect to a rotor is changed in accordance with a wind velocity, and in the yaw control, orientations of the plurality of blades and the rotor are changed in accordance with a wind direction.

The pitch control and the yaw control require a relatively large drive force and thus typically use a plurality of drive devices. An equal load is not necessarily applied to each of the plurality of drive devices, and in some cases, a load applied to a particular one of the plurality of drive devices is larger than a load applied to each of the other drive devices. Particularly in a case where a wind having power equal to or larger than normal such as in a typhoon is blown to the wind turbine, an excessive load may act on various elements of the wind turbine. An excessive load acting on the various elements of the wind turbine might lead to trouble, such as a breakage, in the various elements. Thus, preferably, such trouble is avoided before it happens.

For example, Patent Literature 1 discloses a wind power generator in which a yaw drive unit for controlling positions of a nacelle and a rotor with respect to a tower is installed at a connecting portion between the tower and the nacelle. The yaw drive unit in this wind power generator includes a releasing unit for releasing a yaw drive force from being transmitted. This releasing unit suppresses an influence of yaw control trouble caused by a failure of a yaw drive device, thus achieving improved availability.

RELEVANT REFERENCES

List of Relevant Patent Literatures

Patent Literature 1: Japanese Patent Application Publication No. 2015-140777

SUMMARY

When a ring gear is driven by the plurality of drive devices in order to perform pitch control and yaw control, due to a fact that there is variation in size of a backlash (a gap) between an output portion of each of the drive devices and the ring gear, an excessive load may be applied to a particular one of the plurality of drive devices. In recent years, with an increase in wind turbine output, the number of the drive devices used to drive the ring gear needs to be increased, and thus the above-described problem has become particularly pronounced. That is, when the ring gear is caused to actively rotate by the drive devices or when the ring gear is caused to rotate by an external force such as wind power applied to the wind turbine that has been stopped, stress (a load) acts between the output portion of each of the drive devices and the ring gear. However, since a size of a backlash between each of the drive devices and the ring gear is different depending on the different drive devices, a load acting between the output portion and the ring gear varies among the drive devices.

As thus described, based on a backlash, a load acting between the output portion and the ring gear varies among the drive devices, so that the drive devices include a type on which a relatively large load acts and a type on which a relatively small load acts. With a relatively large load continuously acting on a particular one of the drive devices, a load larger than normal is applied to the particular one of the drive devices, resulting in a reduction in device life.

Such a reduction in device life may occur similarly also in a case where a power shut-off mechanism capable of releasing a drive force from being transmitted, such as the above-mentioned releasing unit of Patent Literature 1, namely, a clutch structure is provided in each of the drive devices. That is, in a case where a yaw drive force is released from being transmitted in one of the plurality of drive devices and thus the one of the plurality of drive devices is substantially disabled, an increased load is applied to each of the other drive devices. In this case, when a load acting between the output portion and the ring gear varies among said other drive devices, a life of any of the other drive devices on which a relatively large load acts is further reduced.

For this reason, in a case where a ring gear is driven by a plurality of drive devices, from the viewpoint of prolonging a life of each of the drive devices, it is desirable to suppress variation in load applied to each of the drive devices so that a magnitude of the load is made uniform in a balanced manner among the drive devices.

In view of the above-mentioned circumstances, it is an object of the present invention to provide a wind turbine drive system and a wind turbine that are capable of suppressing variation in load applied to each of the drive devices among drive devices.

One aspect of the present invention relates to a wind turbine drive system including a plurality of drive devices provided in a first structure and including a meshing portion meshing with a ring gear provided in a second structure, the first structure and the second structure being configured to rotate relative to each other, each of the plurality of drive devices including a motor drive portion for outputting power, a speed reducing portion for receiving the power transmitted from the motor drive portion, and a motor braking portion for braking the motor drive portion, a state quantity detection unit for detecting, for each of the plurality of drive devices, a load between the meshing portion of the each of the plurality of drive devices and the ring gear, and a control unit for controlling the motor drive portion and/or the motor braking portion of each of the plurality of drive devices based on the load for the each of the plurality of drive devices detected by the state quantity detection unit, so as to reduce a degree of variation in the load among the plurality of drive devices.

It is possible that each of the plurality of drive devices is fixed to the first structure via a fastener, and the state quantity detection unit detects the load by measuring an amount of a force acting on the fastener.

The state quantity detection unit may detect the load by measuring an amount of a force acting on the speed reducing portion. Particularly, the state quantity detection unit may detect bending stress, torsional stress, or the like applied to a case of the speed reducing portion.

The control unit may reduce the degree of variation in the load among the plurality of drive devices by adjusting the number of rotations or a torque of the motor drive portion of each of the plurality of drive devices.

In a state where the motor braking portion of each of the plurality of drive devices is applying a braking force to the corresponding motor drive portion, particularly in a state where the corresponding motor drive portion is stopped from operating, the control unit may reduce the degree of variation in the load among the plurality of drive devices by controlling at least the motor braking portion of a drive device for which the load is largest among the plurality of drive devices to weaken the braking force thereof.

The control unit may control the motor drive portion and/or the motor braking portion of each of the plurality of drive devices to reduce the degree of variation in the load among the plurality of drive devices in a case where the degree of variation in the load among the plurality of drive devices deviates from a permissible range.

The control unit may determine, based on a magnitude of the load for each of the plurality of drive devices detected by the state quantity detection unit, whether or not to control the motor drive portion and/or the motor braking portion of each of the plurality of drive devices to reduce the degree of variation in the load among the plurality of drive devices.

Another aspect of the present invention relates to a wind turbine including a first structure and a second structure configured to rotate relative to each other, a ring gear provided in the second structure, and the above-described wind turbine drive system.

Advantages

According to the present invention, it is possible to effectively suppress variation in load applied to each of the drive devices among drive devices.

DESCRIPTION OF THE PREFERRED EMBODIMENTS

Figure 1:
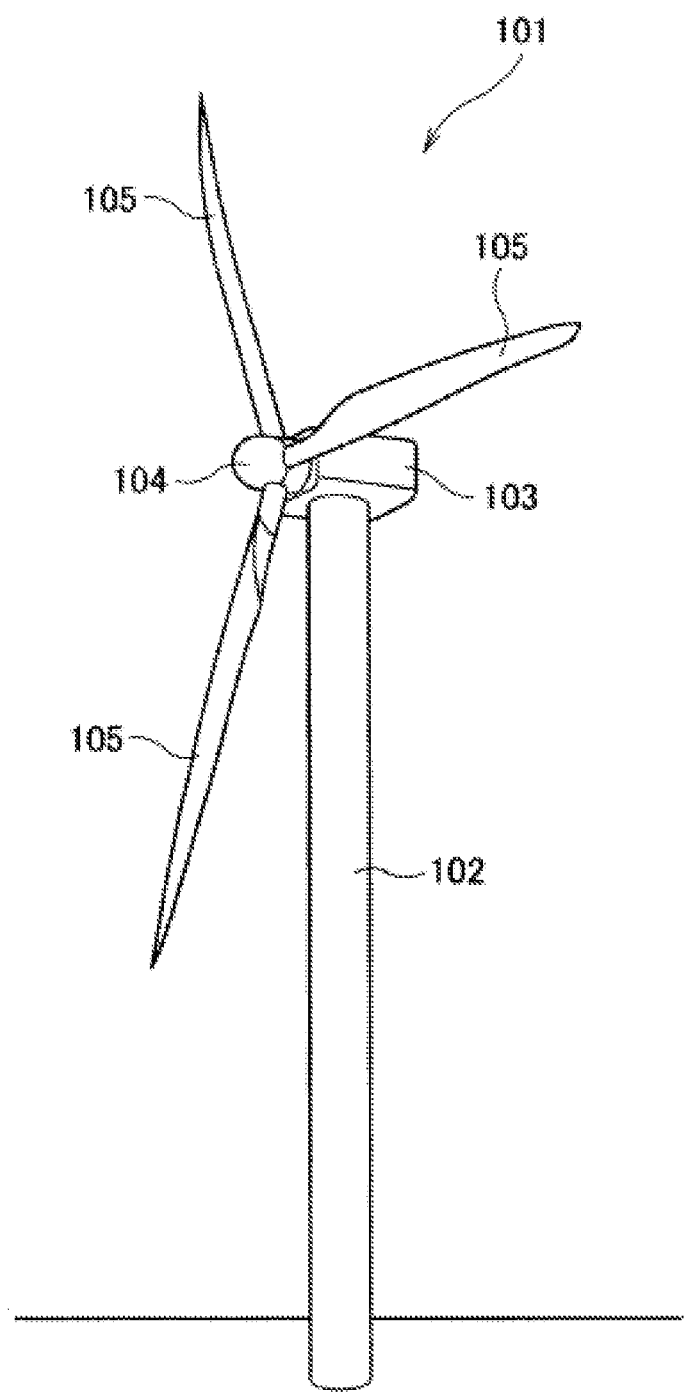
FIG. 1 is a perspective view of a wind turbine.

An embodiment of the present invention will now be described with reference to the appended drawings. In the drawings, for the sake of ease of illustration and understanding, a scale size, a dimensional ratio, and so on are altered or exaggerated as appropriate from actual values.

Figure 2:
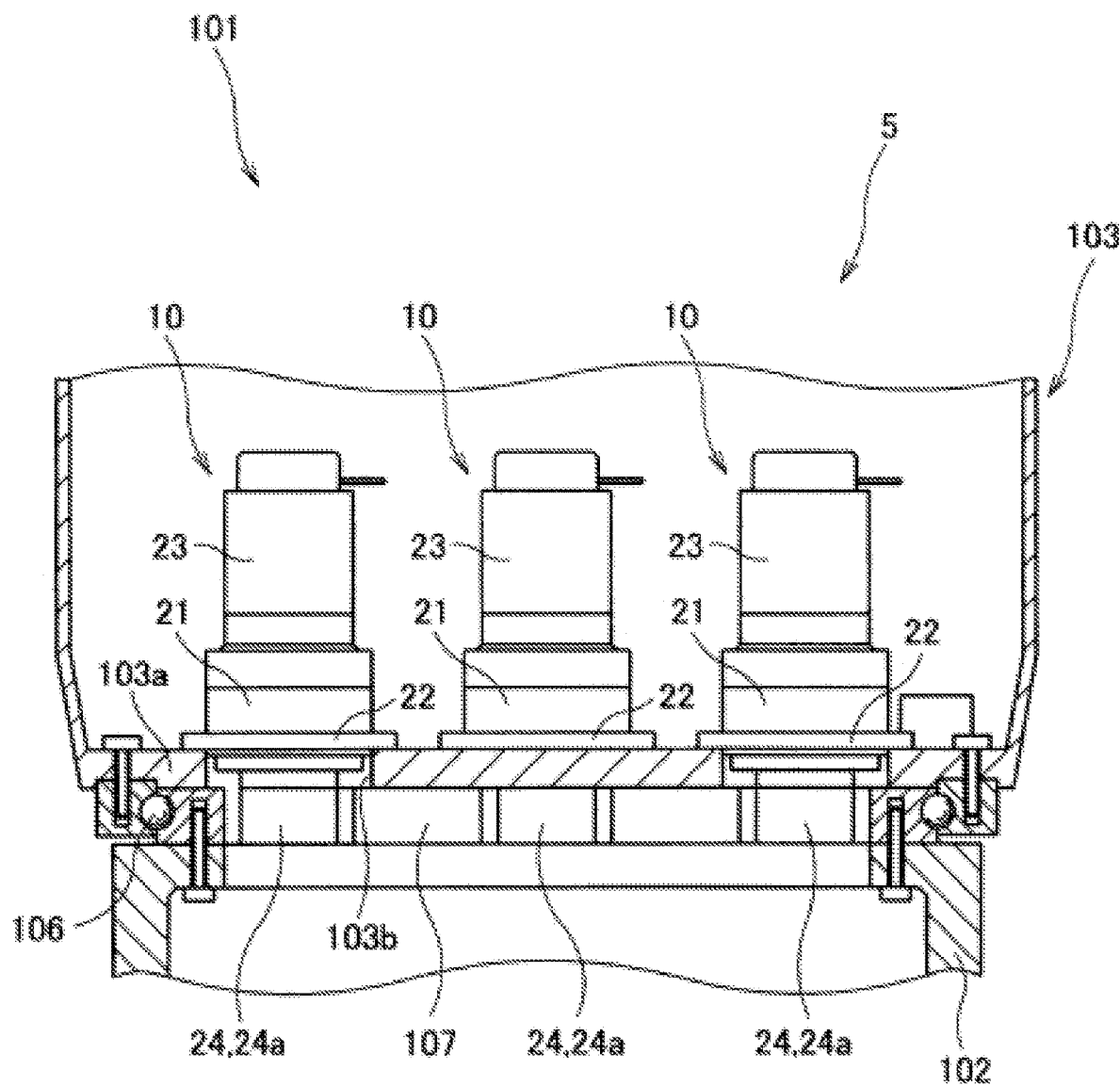
FIG. 2 is a sectional view showing part of a tower and a nacelle.
Figure 3:
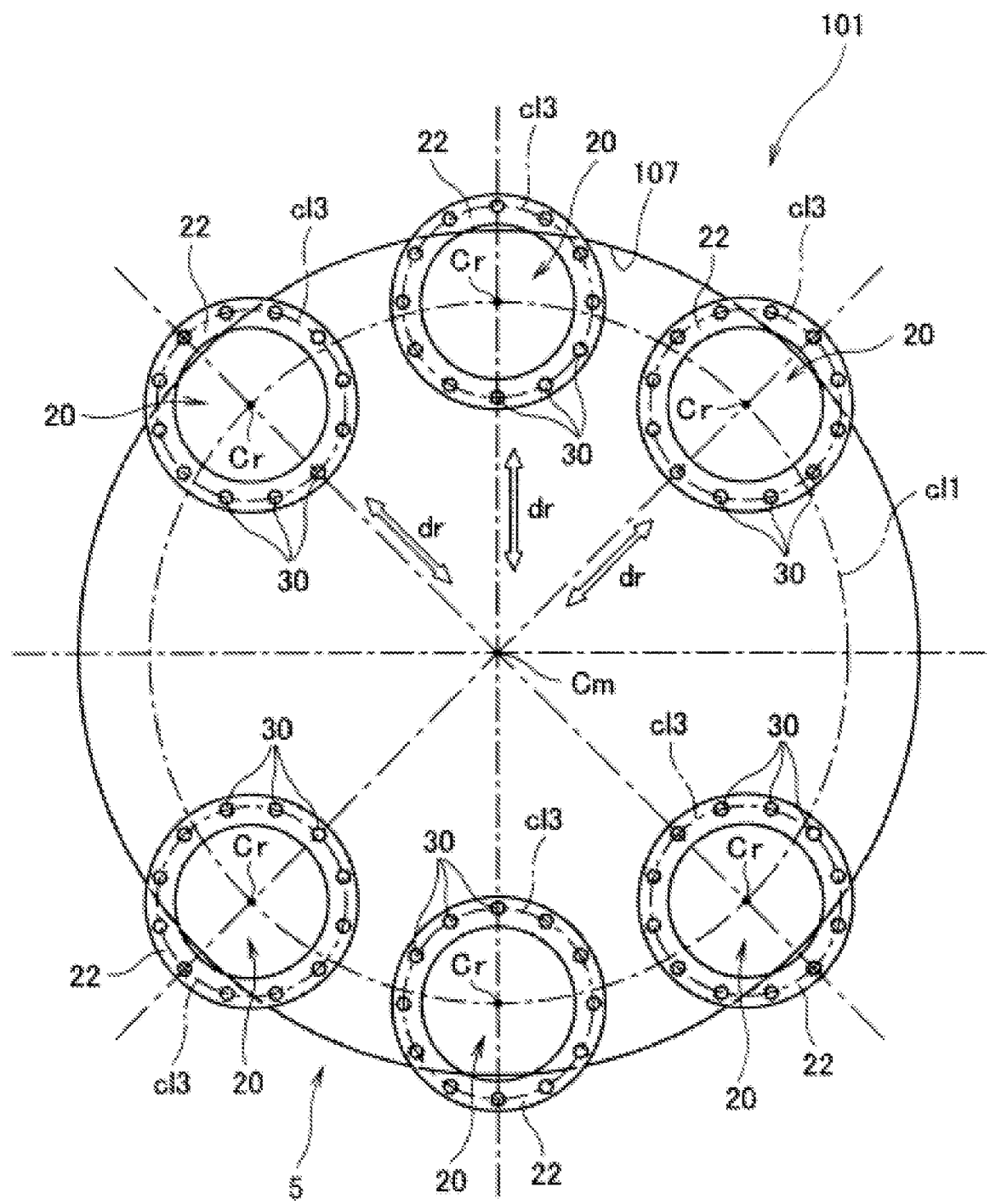
FIG. 3 is a plan view showing an arrangement of drive devices in a movable section shown in FIG. 2.
Figure 4:
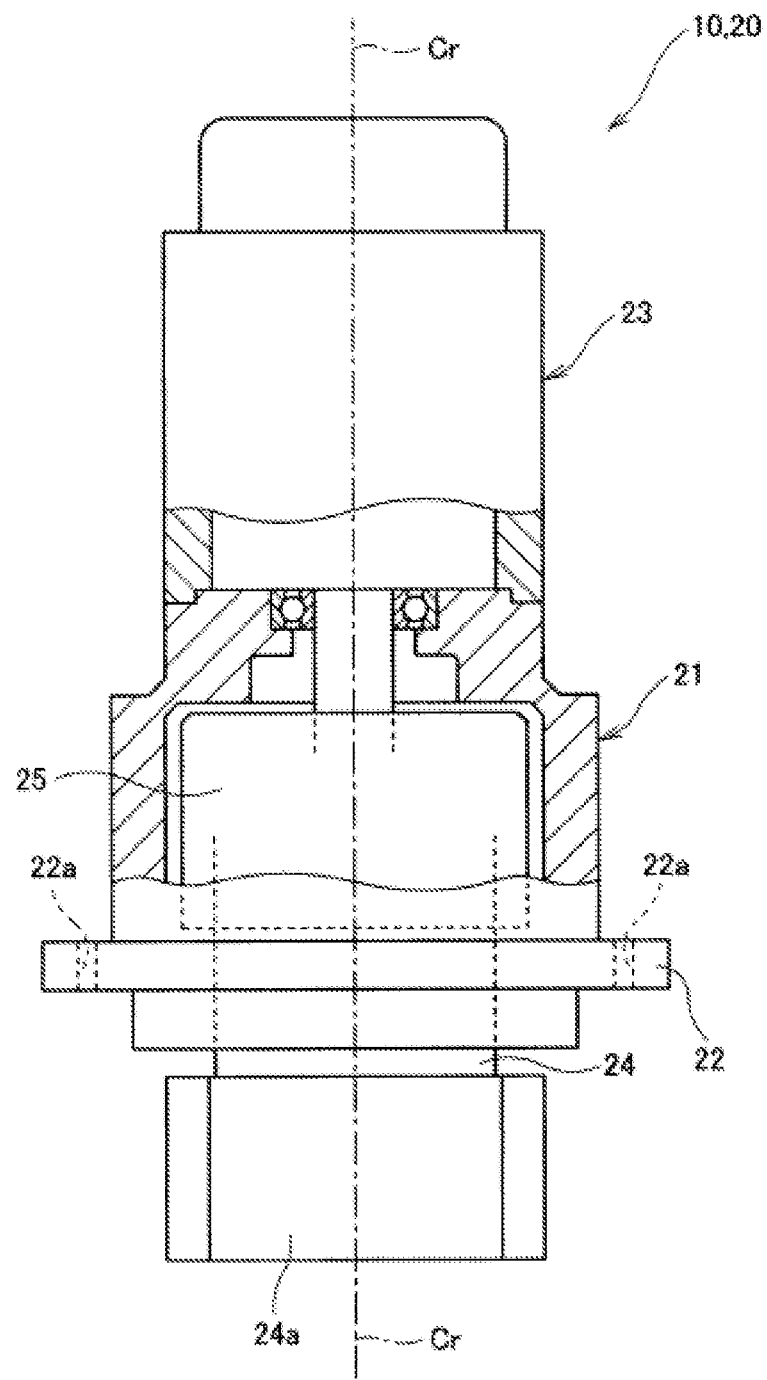
FIG. 4 is a view of a drive device as seen from a lateral side, part of which is shown in cross-section.
Figure 5:
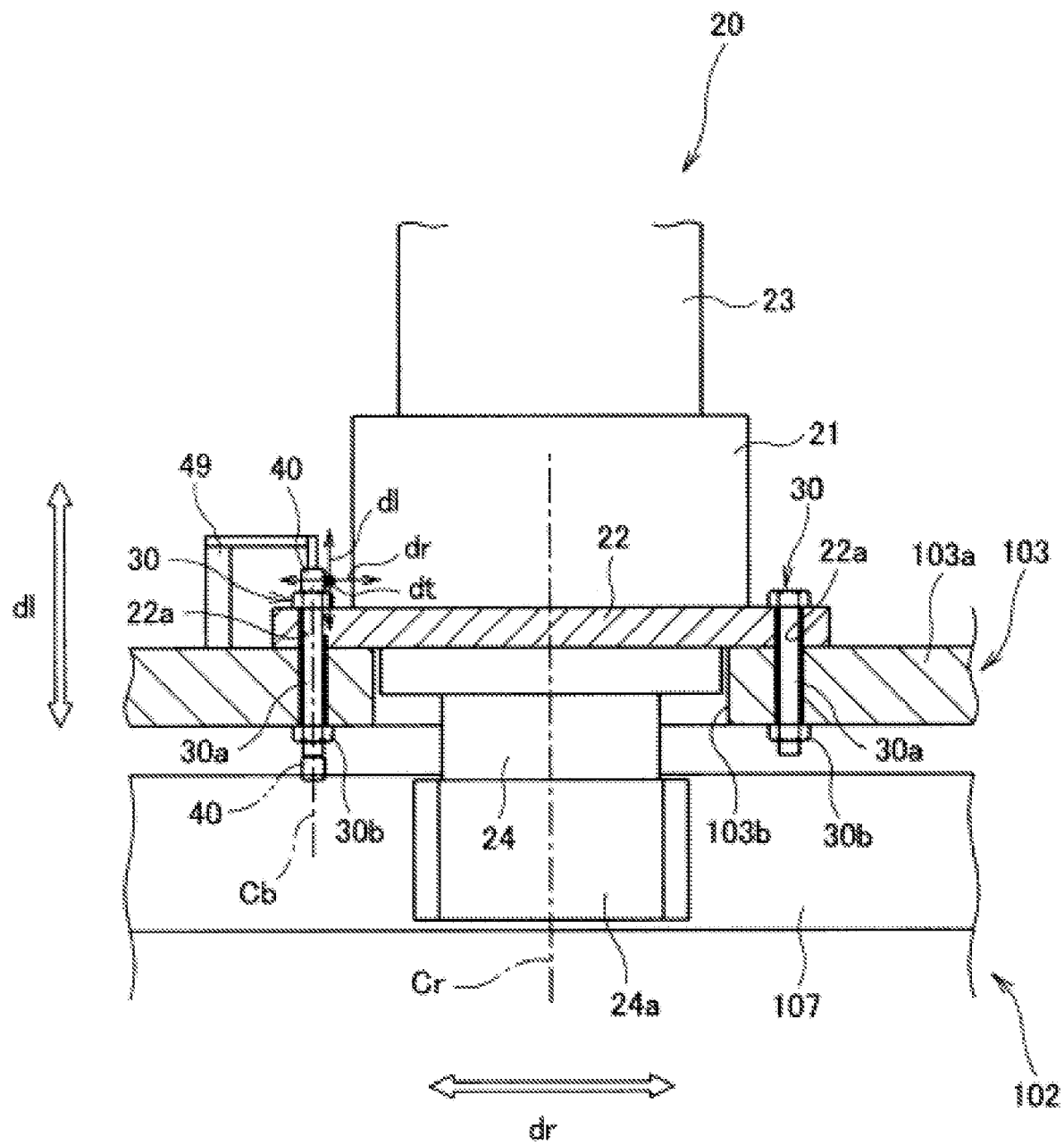
FIG. 5 is a view of an installation portion of the drive device, part of which is shown in cross-section.

FIG. 1 is a perspective view of a wind turbine 101. FIG. 2 is a sectional view showing part of a tower 102 and a nacelle 103. In FIG. 2, as for a drive device 10, an outer appearance thereof is shown instead of a cross-section thereof. FIG. 3 is a plan view showing an arrangement of the drive devices 10 in a movable section shown in FIG. 2. FIG. 4 is a view of the drive device 10 as seen from a lateral side, part of which is shown in cross-section. FIG. 5 is a view showing an installation portion of the drive device 10, part of which is shown in cross-section.

The drive device 10 is capable of driving the nacelle 103 installed so as to be rotatable with respect to the tower 102 of a wind turbine 101 or driving a blade 105 installed so as to be swingable in a pitch direction with respect to a rotor 104 mounted to the nacelle 103. That is, the drive device 10 can be used as a yaw drive device for carrying out yaw driving so as to cause the nacelle 103 to rotate with respect to the tower 102 and also as a pitch drive device for carrying out pitch driving so as to cause a shaft portion of the blade 105 to rotate with respect to the rotor 104. While the following describes, as an example, a case where the drive device 10 is used as a yaw drive device, the present invention is applicable also to a case where the drive device 10 is used as a pitch drive device.

As shown in FIG. 1, the wind turbine 101 includes the tower 102, the nacelle 103, the rotor 104, the blade 105, and so on. The tower 102 extends upward in a vertical direction from the ground. The nacelle 103 is installed so as to be rotatable with respect to a top portion of the tower 102. Rotation of the nacelle 103 with respect to the tower 102 is yaw rotation about a longitudinal direction of the tower 102 as a rotation center. The nacelle 103 is driven by a plurality of drive devices 10 to rotate with respect to the tower 102. Inside the nacelle 103, devices necessary for wind power generation are installed. For example, a power transmission shaft, an electric power generator connected to said power transmission shaft, and so on are disposed therein. The rotor 104 is connected to the power transmission shaft and is rotatable with respect to the nacelle 103. A plurality of (in an example shown in FIG. 1, three) blades 105 are provided and extend from the rotor 104 in a radial direction about a rotation axis of said rotor 104 with respect to the nacelle 103. The plurality of blades 105 are arranged at an equal angle from each other.

The blades 105 are rotatable in the pitch direction, i.e. rotatable about a longitudinal direction thereof with respect to the rotor 104. A connection point between the blades 105 and the rotor 104 is configured as a movable section so that the blades 105 and the rotor 104 are rotatable relative to each other. The blades 105 are driven to rotate by a drive device provided as a pitch drive device. The drive device as the pitch drive device is configured similarly to an after-mentioned drive device 10 as a yaw drive device.

As shown in FIG. 2, the nacelle 103 is installed so as to be rotatable at a bottom portion 103a thereof with respect to the top portion of the tower 102 via a bearing 106. A ring gear 107 having internal teeth formed on an inner periphery thereof is fixed to the top portion of the tower 102. The ring gear 107 are not limited in terms of its teeth to the internal teeth provided on the inner periphery thereof and may have external teeth provided on an outer periphery thereof. In the drawings, the teeth of the ring gear 107 are not shown.

As shown in FIG. 2 and FIG. 3, with respect to the nacelle 103 (a first structure) and the tower 102 (a second structure)

configured to rotate relative to each other, the plurality of drive devices 10 are provided in the nacelle 103. Each of the drive devices 10 includes a meshing portion 24a meshing with the teeth of the ring gear 10 provided in the tower 102. As shown in FIG. 4, each of the drive devices 10 is provided with an electric motor 23 including a motor drive portion and a motor braking portion, which will be mentioned later, and a speed reducing portion 25 receiving power transmitted from said electric motor 23 (particularly, the motor drive portion). The motor drive portion outputs rotational power, and the motor braking portion can reduce the rotational power outputted from the motor drive portion by braking the motor drive portion. The term "braking" used herein is to be broadly construed, and a definition thereof embraces retaining a stopped state of an object that has been stopped and stopping a moving object.

By driving the drive devices 10 thus configured, it is possible to cause the nacelle 103 (the first structure) as one of movable sections of the wind turbine 101 to rotate with respect to the tower 102 (the second structure) as the other movable section of the wind turbine 101. Particularly, the plurality of drive devices 10 included in a wind turbine drive system 5 mentioned above are operated in a synchronized manner and thus provides drive power of a magnitude sufficient to be able to cause the nacelle 103, which is a heavy object, to properly swivel with respect to the tower 102. The drive devices 10 operate based on a control signal sent from an after-mentioned controller 110 (a control unit, see FIG. 7) to the electric motor 23 (the motor drive portion and the motor braking portion).

As shown in FIG. 3, the ring gear 107 is formed in a circumferential shape and has a center axis Cm. The nacelle 103 rotates about the center axis Cm of the ring gear 107. In an example shown, the center axis Cm of the ring gear 107 agrees with the longitudinal direction of the tower 102. In the following description, a direction parallel to the center axis Cm of the ring gear 107 is simply referred to also as an "axial direction dl."

In the wind turbine 101 shown, as shown in FIG. 3, there are provided a pair of wind turbine drive systems 5 arranged in rotational symmetry about the center axis Cm of the ring gear 107. Each of the wind turbine drive systems 5 includes three drive devices 10. Six drive device bodies 20 in total included in the pair of wind turbine drive systems 5 are arranged along a circumference cl1 (see FIG. 3) about the center axis Cm of the ring gear 107. The three drive devices 10 included in each of the wind turbine drive systems 5 are arranged at given intervals along the circumference cl1.

Each of the drive devices 10 has a drive device body 20 fixed to the nacelle 103. As shown in FIG. 5, each of the drive devices 10 is fixed to the nacelle 103 (the first structure) via a fastener 30 disposed so as to extend through a through hole 22a formed through a flange 22 of the drive device body 20. Moreover, each of the drive devices 10 includes a sensor 40 (see FIG. 5) for finding any abnormality in the drive device body 20. The sensor 40 is a sensor for measuring a change in state of the fastener 30 and thus, as will be mentioned later, can indirectly detect stress (a load) between the meshing portion 24a of each of the drive devices 10 and the ring gear 107. Preferably, the sensor 40 is mounted to a location on which no other disturbance than a load between the meshing portion 24a and the ring gear 107 acts or is likely to act. Specifically, more preferably, the sensor 40 is mounted to a case 21, for example.

As shown in FIG. 4, the drive device body 20 is provided with an output shaft 24 including the meshing portion 24a meshing with the ring gear 107, the case 21 rotatably retaining the output shaft 24, and the electric motor 23 fixed to the case 21. Furthermore, the drive device body 20 is provided further with the speed reducing portion 25 housed in the case 21 and connecting the electric motor 23 to the output shaft 24. The speed reducing portion 25 decelerates an input (rotational power) from the electric motor 23 while increasing a torque thereof and transmits the input to the output shaft 24. While there is no particular limitation on a specific configuration of the speed reducing portion 25 thus described, typically, the speed reducing portion 25 can adopt an eccentric oscillating gear-type speed reducing mechanism, a planetary gear-type speed reducing mechanism, or a speed reducing mechanism obtained by combining the eccentric oscillating gear-type speed reducing mechanism with the planetary gear-type speed reducing mechanism.

An end portion of the output shaft 24 distal from the speed reducing portion 25 extends out from the case 21, and the meshing portion 24a is formed at this extending-out portion of the output shaft 24. As shown in FIG. 2 and FIG. 5, the output shaft 24 penetrates through a through hole 103b formed through the bottom portion 103a of the nacelle 103, and the meshing portion 24a meshes with the ring gear 107. The meshing portion 24a has a shape adapted to the ring gear 107. As one example, the meshing portion 24a can be formed as a pinion gear having external teeth configured to mesh with the internal teeth of the ring gear 107. Each of the drive devices 10 has a longitudinal direction axis agreeing with a rotation axis Cr of the output shaft 24. In a state where each of the drive devices 10 is fixed to the nacelle 103, the rotation axis Cr of the output shaft 24 is parallel to the axial direction dl of the wind turbine 101.

The case 21 is formed in a cylindrical shape as shown in FIG. 4 and is disposed so that a longitudinal direction axis thereof is positioned on the rotation axis Cr as shown in FIG. 5. The case 21 is open at both ends thereof along the rotation axis Cr. The meshing portion 24a of the output shaft 24 is exposed from an opening of the case 21 near the tower 102. The electric motor 23 is mounted to an opening of the case 21 on an opposite side to the tower 102. Furthermore, the case 21 includes the flange 22. As shown in FIG. 3, the flange 22 of this example is formed in an annular shape and extends along a circumference cl3 about the rotation axis Cr of the output shaft 24. As shown in FIG. 4 and FIG. 5, the through hole 22a is formed through the flange 22 so as to extend in the axial direction dl. A multitude of through holes 22a are formed on a circumference about the rotation axis Cr of the output shaft 24. In an example shown, twelve through holes 22a are formed.

The fastener 30 penetrates through the flange 22 by extending through each of the through holes 22a formed through the flange 22 of the drive device body 20. In the example shown in FIG. 5, the fastener 30 includes a bolt 30a and a nut 30b. The bolt 30a penetrates through the flange 22 of the drive device body 20 and the bottom portion 103a of the nacelle 103. The nut 30b is screwed with the bolt 30a in a direction from the nacelle 103. The fastener 30 formed of a combination of the bolt 30a and the nut 30b is provided with respect to each of the through holes 22a of the drive device body 20. In the example shown, the drive device bodies 20 are mounted to the nacelle 103 at twelve locations thereon by use of twelve fasteners 30.

The fastener 30 is not limited to the example shown and may have a configuration in which, instead of using the nut 30b, a female screw with which a male screw of the bolt 30a can be screwed is formed in a through hole of the nacelle 103. In this case, the fastener 30 is formed of the bolt 30a, and the male screw of the bolt 30a meshes with the female screw in the through hole of the nacelle 103, thus making it possible to fix the drive device body 20 to the nacelle 103.

The sensor 40 measures a change in state of the fastener 30 and thus can directly or indirectly measure an amount of a force acting on the fastener 30. Specifically, the sensor 40 may be formed of a known sensor for measuring one or more of a weight applied to the fastener 30, a displacement of the fastener 30 with respect to the nacelle 103, and a relative position of the fastener 30 to the nacelle 103. In the example shown, an axial force sensor is used as the sensor 40, and thus it is possible to measure a weight (an axial force) toward a particular direction applied to the fastener 30. As another example, a magnetic sensor or a photoelectric sensor is used as the sensor 40, and thus it becomes possible to measure a position and a displacement of the fastener 30 in a non-contact manner.

As shown in FIG. 5, the sensor 40 is fixedly retained by use of a jig 49 with respect to the nacelle 103, which is one of the movable sections. The axial force sensor constituting the sensor 40 contacts with a head portion of the bolt 30a as a component of the fastener 30. There is, however, no limitation to this example. As shown by a chain double-dashed line in FIG. 5, the sensor 40 may contact with a distal end portion of the bolt 30a on an opposite side to the head portion or may contact with the nut 30b. Furthermore, the sensor 40 may detect a load applied to a fastening bolt fastening the nacelle 103 to the case 21.

The sensor 40 is electrically connected to the after-mentioned controller 110 (see FIG. 7), and an electric signal related to a result of measurement outputted from the sensor 40 is transmitted to the controller 110. The controller 110 monitors an electric signal outputted from the sensor 40, and thus it becomes possible to grasp a change in weight applied to the fastener 30 and a displacement of the fastener 30. Based on a result of measurement by the sensor 40, the controller 110 can control the various types of constituent elements of the wind turbine 101, such as the drive devices 10.

Next, a description is given of the electric motor 23 (the motor drive portion and the motor braking portion).

Figure 6:
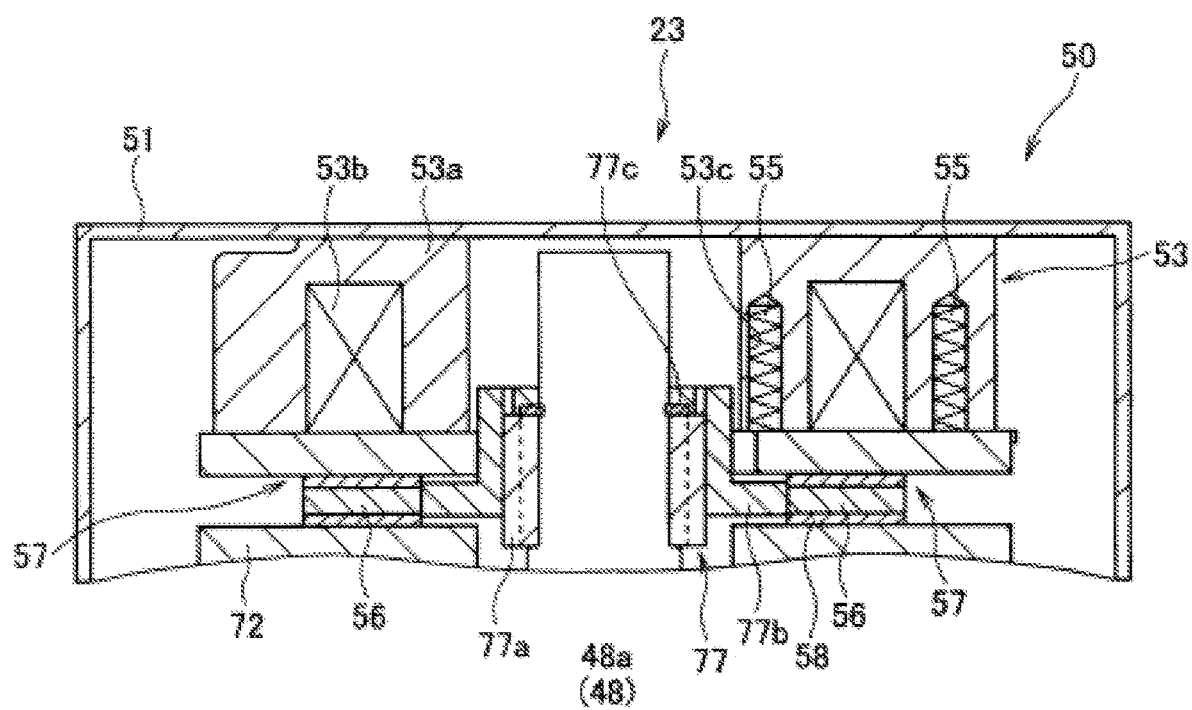
FIG. 6 is a view schematically showing a partial cross-section of an electric motor.

FIG. 6 is a view schematically showing a partial cross-section of the electric motor 23.

The electric motor 23 provided with a motor drive portion 48 and a motor braking portion 50 is provided in each of the drive devices 10, and one motor braking portion 50 is mounted to each motor drive portion 48. The motor drive portion 48 can be formed of any motor device capable of controlling, based on a command from the controller 110 (see FIG. 7), the number of rotations of a drive shaft 48a. The motor braking portion 50 includes a mechanism as an electromagnetic brake for, based on a command from the controller 110 (see FIG. 7), braking rotation of the drive shaft 48a of the motor drive portion 48 or releasing the drive shaft 48a from being braked. In a state where rotation of the drive shaft 48a is braked, the number of rotations of the drive shaft 48a is reduced, and thus eventually, the drive shaft 48a can be completely stopped from rotating. On the other hand, in a state where the drive shaft 48a is released from being braked, without being braked by the motor braking portion 50, the drive shaft 48a can rotate basically at an original number of rotations corresponding to electric power supplied to the motor drive portion 48. Rotational power from the drive shaft 48a of the motor drive portion 48 is transmitted to the output shaft 24 via the speed reducing portion 25. While the foregoing has described a method for reducing variation in load between the meshing portion 24a of each of the drive devices and the ring gear 107 by controlling the number of rotations of the drive shaft 48a of the motor drive portion 48, there is no limitation to the above-described method. For example, it is also possible to reduce variation in load between the meshing portion 24a of each of the drive devices and the ring gear 107 by controlling a torque of the drive shaft 48a of the motor drive portion 48. There is no particular limitation on such a method for controlling the number of rotations or a torque of the drive shaft 48a of the motor drive portion 48. For example, it is possible to control the number of rotations or a torque of the drive shaft 48a by adjusting at least one of a voltage applied to the motor drive portion 48 and an electric current supplied to the motor drive portion 48.

The motor braking portion 50 of this example is mounted to an end portion of a cover 72 of the motor drive portion 48 on an opposite side to the speed reducing portion 25 and includes a housing 51, a friction plate 56, an armature 57, an elastic member 55, an electromagnet 53, a first friction plate connecting portion 77, and so on.

The housing 51 is a structure housing the friction plate 56, the armature 57, the elastic member 55, the electromagnet 53, the first friction plate connecting portion 77, and so on and is fixed to the cover 72 of the motor drive portion 48.

The friction plate 56 is connected to the drive shaft 48a of the motor drive portion 48 via the first friction plate connecting portion 77. In a through hole of the friction plate 56, the drive shaft 48a is disposed in a state where one end portion thereof penetrates through the through hole.

The first friction plate connecting portion 77 of this example includes a spline shaft 77a and a slide shaft 77b. The spline shaft 77a is fixed to an outer periphery of the one end portion of the drive shaft 48a through key coupling via a key member (not shown) and engagement with a stopper ring 77c. The slide shaft 77b is mounted to the spline shaft 77a so as to be slidable in an axial direction. Furthermore, in the first friction plate connecting portion 77, there is provided a spring mechanism (not shown) for situating the slide shaft 77b at a predetermined position in the axial direction with respect to the spline shaft 77a. An inner periphery of the friction plate 56 is fixed to an edge portion of an outer periphery of a flange-shaped portion of the slide shaft 77b, so that the friction plate 56 is coupled integrally with the slide shaft 77b.

In the motor braking portion 50 having the above-described configuration, when the drive shaft 48a rotates, the spline shaft 77a, the slide shaft 77b, and the friction plate 56 also rotate together with the drive shaft 48a. In a state where the after-mentioned electromagnet 53 is excited, the slide shaft 77b and the friction plate 56 that are retained so as to be slidable in the axial direction with respect to the drive shaft 48a and the spline shaft 77a are situated at a predetermined position in the axial direction of the spline shaft 77a by the spring mechanism. When disposed at this predetermined position, the friction plate 56 is separated from the armature 57 and a friction plate 58, which will be mentioned later.

The armature 57 is provided so as to be contactable with the friction plate 56. The armature 57 is provided as a member for generating a braking force for braking rotation of the drive shaft 48a by contacting with the friction plate 56.

Furthermore, in this example, the friction plate 58 is provided at a location on one end portion of the cover 72 of the motor drive portion 48, where the friction plate 58 is opposed to the friction plate 56. The friction plate 58 is installed at such a position as to be contactable with the friction plate 56.

The elastic member 55 is retained in an electromagnetic body 53a of the electromagnet 53, which will be mentioned later, and biases the armature 57 in a direction from the electromagnet 53 toward the friction plate 56. Particularly, as a plurality of elastic members 55 of this example, in the electromagnetic body 53a, two inner peripheral and outer peripheral elastic members 55 are arranged in a circumferential direction concentrically about the drive shaft 48a. The above-mentioned form of arranging the elastic members 55 is merely an example, and the elastic members 55 may be arranged in any other form.

The electromagnet 53 includes the electromagnetic body 53a and a coil portion 53b and attracts the armature 57 by a magnetic force so as to separate the armature 57 from the friction plate 56.

To the housing 51, the electromagnetic body 53a is fixed at an end portion thereof on an opposite side to where the electromagnetic body 53a is opposed to the armature 57. The electromagnetic body 53a has a plurality of elastic member retaining holes 53c open toward the armature 57, and the elastic members 55 are disposed in the elastic member retaining holes 53c, respectively.

The coil portion 53b is installed inside the electromagnetic body 53a and disposed along the circumferential direction of the electromagnetic body 53a. Supplying and shutting off of an electric current to the coil portion 53b is performed based on a command of the controller 110.

For example, when the motor braking portion 50 releases the drive shaft 48a from being braked, based on a command of the controller 110, an electric current is supplied to the coil portion 53b to energize the electromagnet 53. When the electromagnet 53 is energized and thus is brought into an exited state, the armature 57 is attracted to the coil portion 53b by a magnetic force generated at the electromagnet 53. At this time, the armature 57 is attracted to the electromagnet 53 against an elastic force (a spring force) of the plurality of elastic members 55. With this configuration, the armature 57 is separated from the friction plate 56, and thus the drive shaft 48a is released from being braked. Accordingly, in a state where the electromagnet 53 is excited and thus the drive shaft 48a is released from being braked, the armature 57 is brought into a state of contacting with the electromagnetic body 53a.

On the other hand, when the motor braking portion 50 brakes the drive shaft 48a, based on a command of the controller 110, a supply of an electric current to the coil portion 53b is shut off to demagnetize the electromagnet 53. When the electromagnet 53 is brought into a demagnetized state, the armature 57 is biased toward the friction plate 56 by an elastic force of the plurality of elastic members 55, and thus the armature 57 contacts with the friction plate 56. With this configuration, a friction force is generated between the armature 57 and the friction plate 56, and thus rotation of the drive shaft 48a is braked. FIG. 6 shows a state where the electromagnet 53 is demagnetized, which is a state where rotation of the drive shaft 48a is braked.

Furthermore, in a state where the electromagnet 53 is demagnetized and thus the drive shaft 48a is braked, the friction plate 56 is in contact also with the friction plate 58 under a biasing force acting from the armature 57. Accordingly, when the electromagnet 53 is demagnetized, the friction plate 56 is brought into a state of being sandwiched between the armature 57 and the friction plate 58 under a biasing force from the plurality of elastic members 55. With this configuration, by a friction force generated between the armature 57 and the friction plate 56 and a friction force generated between the friction plate 56 and the friction plate 58, rotation of the drive shaft 48a is braked to an extremely high degree.

<Control for Suppressing Variation in Load Among Drive Devices>

Next, a description is given of one example of a control method for suppressing variation in load applied to each of the drive devices 10 among the drive devices 10.

Figure 7:
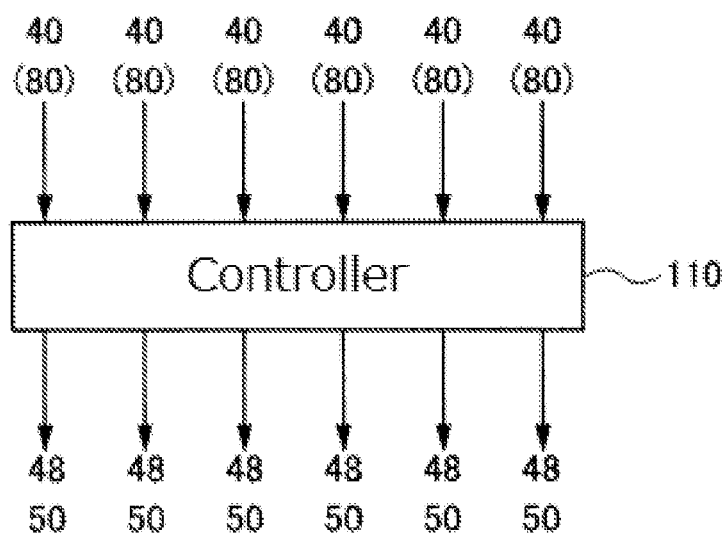
FIG. 7 is a block diagram for explaining a functional configuration of a controller.

FIG. 7 is a block diagram for explaining a functional configuration of the controller 110. In this example, the above-mentioned sensor 40 is used as a state quantity detection portion (a state quantity detection unit) 80. The controller 110 is capable of receiving a result of detection from each of the sensors 40 provided in the plurality of drive devices 10 (in this example, six drive devices 10), respectively, and outputting a control signal for controlling the motor drive portion 48 and the motor braking portion 50 provided in each of the drive devices 10. There is no particular limitation on an installation position of the controller 110. The controller 110 may be provided integrally with any of the elements constituting the wind turbine 101 (for example, the tower 102, the nacelle 103, the rotor 104, or the blade 105) or independently of these elements.

In this embodiment, by the state quantity detection portion 80, information corresponding to stress (a load) between the meshing portion 24a of each of the plurality of drive devices 10 and the ring gear 107 is detected for the each of the drive devices 10. Based on the load for the each of the drive devices 10 detected by the state quantity detection portion 80, the controller 110 controls the motor drive portion 48 and/or the motor braking portion 50 of each of the plurality of drive devices so as to reduce a degree of variation in load among the plurality of drive devices 10.

The state quantity detection portion 80 is provided in each of the drive devices 10 and directly or indirectly detects a load between the meshing portion 24a of a corresponding one of the drive devices 10 and the ring gear 107. The state quantity detection portion 80 can be formed of any sensor. In this example, the above-mentioned sensor 40 functions as the state quantity detection portion 80. That is, an amount of a force acting on the fastener 30 is measured by the sensor 40 (the state quantity detection portion 80) so as to detect a "load between the meshing portion 24a and the ring gear 107," and a result of the detection is sent from each of the sensors 40 to the controller 110.

The state quantity detection portion 80 is not limited to the sensor 40 for detecting a state quantity of the fastener 30 and can be formed of any type of sensor capable of detecting any state quantity varying depending on a magnitude of a "load between the meshing portion 24a and the ring gear 107." For example, a sensor capable of measuring an amount of a force acting on the speed reducing portion 25 (for example, a sensor for detecting a distortion generated in the speed reducing portion 25) can be installed in the speed reducing portion 25 of each of the drive devices 10 and used as the state quantity detection portion 80 to detect a "load between the meshing portion 24a and the ring gear 107."

The controller 110, on the other hand, is capable of controlling the motor drive portion 48 and/or the motor braking portion 50 of each of the plurality of drive devices by any method. For example, in a case where the drive shaft 48a of the motor drive portion 48 of each of the drive devices 10 is rotating so as to drive the ring gear 107 to rotate, the controller 110 can reduce a degree of variation in load among the drive devices 10 by adjusting the number of rotations of each of the motor drive portions 48. On the other hand, in a case where, in each of the drive devices 10, a braking force has been applied to the drive shaft 48a of the motor drive portion 48 by the motor braking portion 50 and thus has stopped said drive shaft 48a, it is possible to reduce a degree of variation in load among the drive devices 10 by adjusting the braking force applied to the motor drive portion 48 by the motor braking portion 50 so as to change a degree of ease of rotation of the drive shaft 48a of each of the motor drive portions 48.

Here, "adjusting the number of rotations of the motor drive portion 48" and "adjusting a braking force applied by the motor braking portion 50" can be performed by any method. For example, the number of rotations of the motor drive portion 48 can be directly adjusted by changing, by use of an inverter, a frequency or a voltage of electricity supplied to the motor drive portion 48. Furthermore, by controlling energization with respect to the motor braking portion 50 (particularly, the coil portion 53b), a braking force applied from the motor braking portion 50 to the motor drive portion 48 (the drive shaft 48a) can be changed, and thus the number of rotations of the motor drive portion 48 can also be indirectly adjusted. While the foregoing has described "adjusting the number of rotations of the motor drive portion 48," any other method for reducing variation in load may be adopted. For example, variation in load may be reduced by, for example, "adjusting a torque of the motor drive portion 48." There is no particular limitation on a method for controlling the number of rotations or a torque of the motor drive portion 48. For example, the number of rotations or a torque of the motor drive portion 48 can be controlled by adjusting at least one of a voltage applied to the motor drive portion 48 and an electric current supplied to the motor drive portion 48.

As mentioned above, while there is variation in size of a backlash (a gap) between the meshing portion 24a of each of the drive devices 10 and the ring gear 107, a "load between the meshing portion 24a and the ring gear 107" varies depending on a size of the backlash. For example, in a case where the backlash is relatively small and thus the meshing portion 24a is pressed relatively strongly against the ring gear 107, the "load between the meshing portion 24a and the ring gear 107" tends to be increased. On the other hand, in a case where the backlash is relatively large and thus the meshing portion 24a is pressed relatively weakly against the ring gear 107, the "load between the meshing portion 24a and the ring gear 107" tends to be decreased. Accordingly, when the backlash between the meshing portion 24a and the ring gear 107 is equal in size among the plurality of drive devices 10, the "load between the meshing portion 24a and the ring gear 107" is also equal among the plurality of drive devices 10. In reality, however, the backlash can hardly be completely equal in size among the plurality of drive devices 10, and the "load among the meshing portion 24a and the ring gear 107" varies among the drive devices 10. Such variation in load may occur not only while the ring gear 107 is being driven by the plurality of drive devices 10 but also while the ring gear 107 has been stopped from rotating under a braking force applied to the motor drive portion 48 by the motor braking portion 50.

With these as a background, in a case where the drive shaft 48a of the motor drive portion 48 of each of the drive devices 10 rotates to drive the ring gear 107 to rotate, the number of rotations or a torque of the motor drive portion 48 of each of the plurality of drive devices 10 is controlled so as to make an adjustment for different sizes of the backlash between each of the meshing portions 24a and the ring gear 107, and thus a degree of variation in load among the drive devices 10 can be reduced. For example, preferably, any of the drive devices 10 whose "load between the meshing portion 24a and the ring gear 107" is relatively larger than that of the other drive devices 10 is controlled so as to reduce the number of rotations or a torque of the motor drive portion 48. On the other hand, preferably, any of the drive devices 10 whose "load between the meshing portion 24a and the ring gear 107" is relatively smaller than that of the other drive devices 10 is controlled so as to increase the number of rotations or a torque of the motor drive portion 48. With this configuration, the backlash between each of the meshing portions 24a and the ring gear 107 can be made uniform in size.

More specifically, the controller 110 can control the motor drive portion 48 and/or the motor braking portion 50 of a drive device 10 for which the "load between the meshing portion 24a and the ring gear 107" is the largest and/or a drive device 10 for which the "load between the meshing portion 24a and the ring gear 107" is the smallest. For example, a load for one of the drive devices 10 whose "load between the meshing portion 24a and the ring gear 107" is the largest can be reduced by reducing the number of rotations or a torque of the motor drive portion 48 in said one of the drive devices 10. On the other hand, a load for any of the drive devices 10 whose "load between the meshing portion 24a and the ring gear 107" is relatively large can be alleviated by increasing the number of rotations or a torque of the motor drive portion 48 in one of the drive devices 10 whose "load between the meshing portion 24a and the ring gear 107" is the smallest.

Furthermore, in a case where the ring gear 107 has been stopped from rotating under a braking force applied to the motor drive portion 48 by the motor braking portion 50 of each of the plurality of drive devices 10, the controller 110 can reduce a degree of variation in load among the plurality of drive devices 10 by controlling the motor braking portion 50 of at least "one of the drive devices 10 whose load between the meshing portion 24a and the ring gear 107 is the largest" to weaken the braking force thereof. That is, a barking force applied to the drive shaft 48a of the motor drive portion 48 of one of the drive devices 10 whose load is the largest is weakened, and thus rotation of said drive shaft 48a is facilitated. With this configuration, the drive shaft 48a of the motor drive portion 48 of one of the drive devices 10 whose load is the largest slightly rotates and thus reduces a load between the meshing portion 24a and the ring gear 107, while a load for each of the other drive devices increases, so that the backlash between each of the meshing portions 24a and the ring gear 107 can be made uniform in size.

In this case, the motor braking portion 50 controlled to weaken a braking force is not limited only to the motor braking portion 50 provided in "one of the drive devices 10 whose load between the meshing portion 24a and the ring gear 107 is the largest." That is, it is possible that the controller 110 controls the motor braking portion 50 to weaken a breaking force in each of plural ones of the drive devices 10 whose loads between their respective meshing portion 24a and the ring gear 107 are relatively large. Furthermore, it is also possible that the control portion 110 controls the motor braking portion 50 to weaken a braking force in each of all the drive devices 10.

Furthermore, there is no particular limitation on a specific method for weakening a braking force provided by the motor braking portion 50. For example, it is possible that a predetermined value of a braking force provided by each of the motor braking portions 50 is preset, and the braking force is weakened so as to be weaker than this predetermined value. Furthermore, one of the motor braking portions 50 that is to be controlled may be controlled so as to provide a braking force smaller than a braking force provided by each of the other motor braking portions 50. Furthermore, a braking force applied to the drive shaft 48a is substantially cancelled by setting the braking force to zero (0).

Next, a description is given of an example of a control process flow for suppressing variation in load applied to each of the drive devices 10 among the drive devices 10.

The description is directed first to a control process flow in a case where the drive shaft 48a of the motor drive portion 48 of each of the drive devices 10 rotates to drive the ring gear 107 to rotate.

Figure 8:
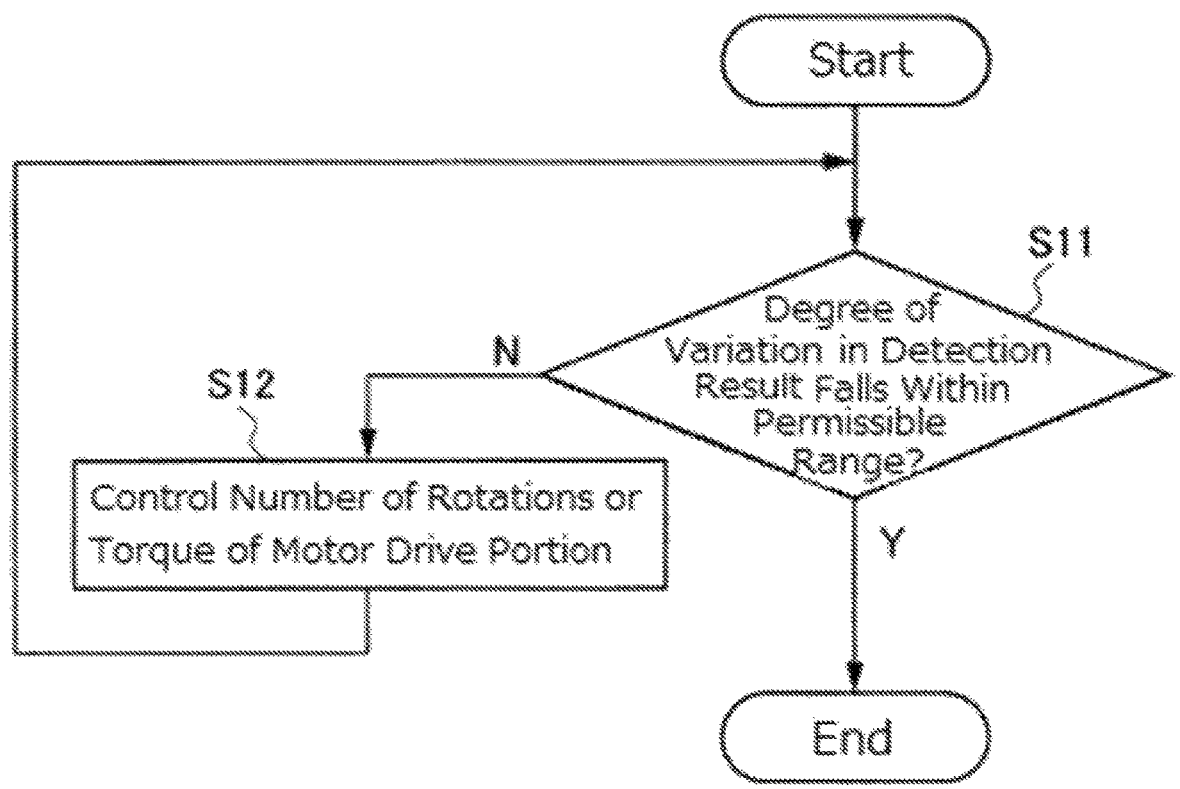
FIG. 8 is a view showing one example of a control process flow.

FIG. 8 is a view showing one example of a control process flow. In this example, first, the controller 110 evaluates a degree of variation in result of detection by the state quantity detection portions 80 (in this example, the sensors 40) and determines whether or not said degree of variation falls within a predetermined permissible range (S11 in FIG. 8).

There is no particular limitation on a specific method for evaluating a degree of variation in result of detection by the state quantity detection portions 80. Typically, in a case where a difference between a maximum value and a minimum value of detection values obtained by the state quantity detection portions 80 among the drive devices 10 is smaller than a predetermined value, it can be evaluated that the "degree of variation in result of detection by the state quantity detection portions 80 falls within a permissible range," and in a case where said difference is equal to or more than the predetermined value, it can be evaluated that the "degree of variation in result of detection by the state quantity detection portions 80 is outside the permissible range." Furthermore, an average value or a median value of detection values obtained respectively by the state quantity detection portions 80 is determined, and a difference between the average value or the median value and each of the detection values of the state quantity detection portions 80 is determined. In a case where said difference is smaller than a predetermined value, it can be evaluated that the "degree of variation in result of detection by the state quantity detection portions 80 falls within a permissible range," and in a case where said difference is equal to or more than the predetermined value, it can be evaluated that the "degree of variation in result of detection by the state quantity detection portions 80 is outside the permissible range." Furthermore, a degree of variation in result of detection by the state quantity detection portions 80 can be evaluated based on any other method.

Furthermore, the "permissible range" described herein can be set as appropriate in accordance with a specific device configuration and can be individually defined based on a such a state quantity as to be able to effectively avoid trouble such as a breakage of the drive devices 10 or the ring gear 107.

Further, in a case where the "degree of variation in load between the meshing portion 24a and the ring gear 107 among the plurality of drive devices 10," namely, the "degree of variation in result of detection by the state quantity detection portions 80 among the plurality of drive devices 10" falls within the permissible range (Y at S11), the controller 110 does not perform a process of reducing the degree of variation in load among the plurality of drive devices 10.

On the other hand, in a case where the "degree of variation in load between the meshing portion 24a and the ring gear 107 among the plurality of drive devices 10," namely, the "degree of variation in result of detection by the state quantity detection portions 80 among the plurality of drive devices 10" is determined to deviate from the permissible range (N at S11), the controller 110 reduces the degree of variation in load among the plurality of drive devices 10 by controlling the number of rotations or a torque of the motor drive portion 48 (S12). The process step S12 of controlling the number of rotations of the motor drive portion 48 is sequentially continued while the "degree of variation in result of detection by the state quantity detection portions 80 among the drive devices 10" keeps deviating from the permissible range. Further, through the above-mentioned process step S12, the degree of variation in result of detection by the state quantity detection portions 80 among the drive devices 10 is adjusted so as to fall within the permissible range (Y at S11), after which the controller 110 controls the motor drive portion 48 of each of the drive devices 10 so that the number of rotations of the motor drive portion 48 is equal among the plurality of drive devices 10.

The description is directed next to a control process flow in a case where the ring gear 107 has been stopped from rotating under a braking force applied to a corresponding one of the motor drive portions 48 by each of the motor braking portions 50.

Figure 9:
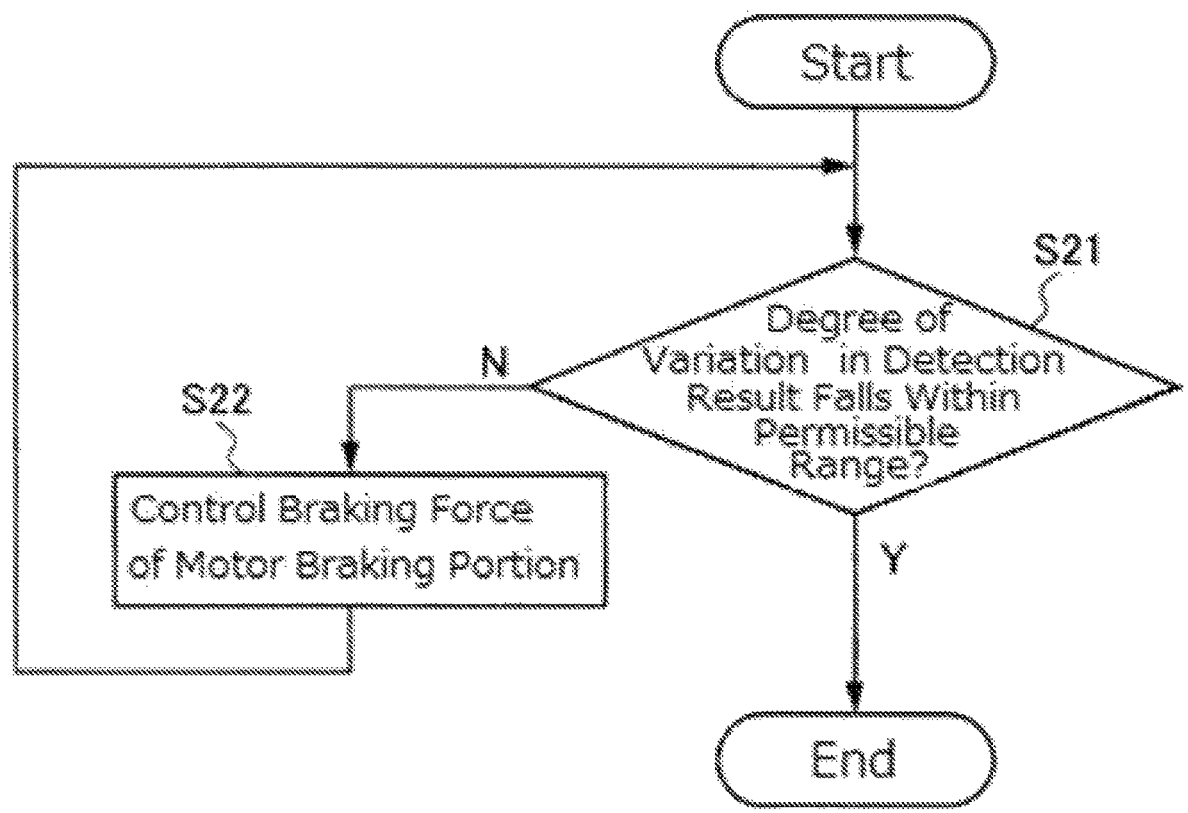
FIG. 9 is a view showing another example of the control process flow.

FIG. 9 is a view showing another example of the control process flow. Also in this example, similarly to the above-mentioned step S11 shown in FIG. 8, the controller 110 evaluates a degree of variation in result of detection by the state quantity detection portions 80 (in this example, the sensors 40) and determines whether or not said degree of variation falls within a predetermined permissible range (S21 in FIG. 9).

In a case where the "degree of variation in result of detection by the state quantity detection portions 80 among the plurality of drive devices 10" is determined to fall within the permissible range (Y at S21), the controller 110 does not perform a process of reducing the degree of variation in load among the plurality of drive devices 10.

On the other hand, in a case where the "degree of variation in result of detection by the state quantity detection portions 80 among the plurality of drive devices 10" is determined to deviate from the permissible range (N at S21), the controller 110 reduces the degree of variation in load among the plurality of drive devices 10 by controlling the motor braking portion 50 to adjust a braking force (S22). The process step (S22) of controlling a braking force of the motor braking portion 50 is sequentially continued while the "degree of variation in result of detection by the state quantity detection portions 80 among the plurality of drive devices 10" keeps deviating from the permissible range.

Further, through the above-mentioned process step S22, the degree of variation in result of detection by the state quantity detection portions 80 among the plurality of drive devices 10 is adjusted so as to fall within the permissible range (Y at S21), after which the controller 110 controls any of the motor braking portions 50 whose braking force has been weakened at the above-mentioned process step S22 to increase the braking force applied from said motor braking portion 50 to the motor drive portion 48. Specifically, the controller 110 controls each of the motor braking portions 50 so that a braking force provided by said motor braking portion 50 is reset to a preset predetermined value or so that a braking force equal to that of each of the other motor braking portions 50 is provided by said motor braking portion 50.

As described above, according to the above-mentioned control process flows shown in FIG. 8 and FIG. 9, a degree of variation in load between the meshing portion 24a of each of the drive devices 10 and the ring gear 107 among the drive devices 10 is reduced, and thus a backlash between each of the meshing portions 24a and the ring gear 107 can be made uniform in size.

The above-mentioned control process flows shown in FIG. 8 and FIG. 9 are intended to eliminate variation in load between the meshing portion 24a and the ring gear 107 among the drive devices 10 and may be implemented in combination with any other process flow. For example, in a case where a load between the meshing portion 24a and the ring gear 107 becomes excessive in one or plural ones of the drive devices 10, which might lead to trouble such as a breakage of the various elements constituting each of the drive devices 10 or the ring gear 107, preferably, a process capable of more effectively preventing such trouble is preferentially implemented.

The following describes an example of a process flow effective in preventing trouble such as a breakage of the various elements constituting each of the drive devices 10 or the ring gear 107.

Figure 10:
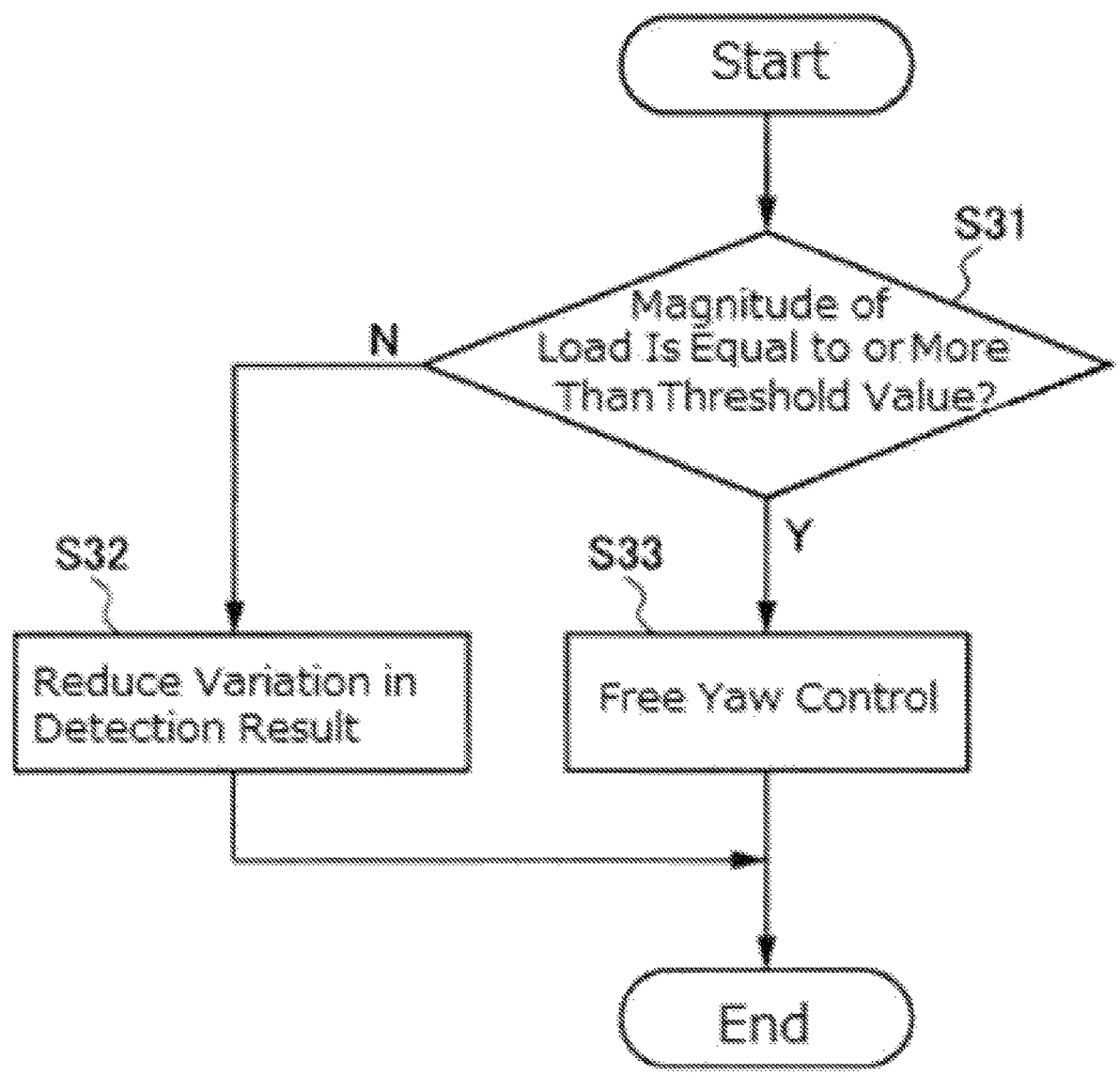
FIG. 10 is a view showing an application example of the control process flows shown in FIG. 8 and FIG. 9.

FIG. 10 is a view showing an application example of the control process flows shown in FIG. 8 and FIG. 9. In a control process flow of this example, based on a magnitude of a load for each of the drive devices 10 detected by the state quantity detection portion 80 (in this example, the sensor 40), the controller 110 determines whether or not to control the motor drive portion 48 and/or the motor braking portion 50 of each of the plurality of drive devices so as to reduce a degree of variation in said load among the drive devices 10.

That is, based on a result of detection by the state quantity detection portion 80, the controller 110 first determines whether or not a "load between the meshing portion 24a and the ring gear 107" in each of the controllers 110 is equal to or more than a predetermined threshold value (S31 in FIG. 10). For example, a detection value (hereinafter, referred to also as a "determination threshold value") of the state quantity detection portion 80 in a case where the "load between the meshing portion 24a and the ring gear 107" is equal to or more than the predetermined threshold value is preset, and the determination at said process step S31 can be performed based on whether or not a detection value of the state quantity detection portion 80 is equal to or more than this determination threshold value.

There is no particular limitation on a specific determination method used at the process step S31, and any method effective in preventing trouble such as a breakage can be adopted in accordance with a specific device configuration. For example, it is possible that in a case where a load between the meshing portion 24a and the ring gear 107 is equal to or more than the predetermined threshold value (i.e., in a case where the state quantity detection portion 80 exhibits a value equal to or more than the determination threshold value) in at least one or more of the plurality of drive devices 10, at the process step S31, it is recognized that the "load between the meshing portion 24a and the ring gear 107" is equal to or more than the predetermined threshold value. Furthermore, it is also possible that only in a case where a load between the meshing portion 24a and the ring gear 107 is equal to or more than the predetermined threshold value in predetermined plural ones (for example, a half of all the drive devices 10 (in this example, three)) or more of the plurality of drive devices 10, at the process step S31, it is recognized that the "load between the meshing portion 24a and the ring gear 107" is equal to or more than the predetermined threshold value.

In a case where, at the above-mentioned process step S31, it is determined that the "load between the meshing portion 24a and the ring gear 107" is not equal to or more than the predetermined threshold value (N at S31), a process of reducing variation in load between the meshing portion 24a and the ring gear 107, namely, variation in result of detection by the state quantity detection portions 80 is performed (S32). The process of reducing variation in result of detection by the state quantity detection portions 80 can be implemented by following, for example, the above-mentioned control process flow shown in FIG. 8 or the above-mentioned control process flow shown in FIG. 9.

On the other hand, in a case where, at the above-mentioned process step S31, it is determined that the "load between the meshing portion 24a and the ring gear 107" is equal to or more than the predetermined threshold value in all the drive devices 10 (Y at S31), the process for reducing variation in result of detection by the state quantity detection portions 80 (see FIG. 8 and FIG. 9) is not performed, and the controller 110 performs free yaw control (S33).

In the free yaw control, free relative rotation between the nacelle 103 (the first structure) and the tower 102 (the second structure) is permitted, and a braking force and a drive force that might inhibit the free relative rotation between the nacelle 103 and the tower 102 are reduced or cancelled. In a case where the motor drive portion 48 and the motor braking portion 50 as mentioned above are provided, the controller 110 shuts off energization with respect to the motor drive portion 48 so as to stop the drive shaft 48a from rotating and also controls energization with respect to the motor braking portion 50 so that a braking force is not applied from the motor braking portion 50 to the motor drive portion 48 (namely, the drive shaft 48a). Furthermore, in a case where any other drive unit and any other braking unit are provided, the controller 110 controls the any other drive unit and the any other braking unit to eliminate a braking force and a drive force that might inhibit free relative rotation between the nacelle 103 and the tower 102. For example, in a case where there is provided a braking device (not shown), such as a caliper brake, for directly braking a rotational operation of the ring gear 107, the controller 110 controls said braking device so that a braking force is not applied from said braking device to the ring gear 107.

With the controller 110 performing the above-mentioned free yaw control, the meshing portion 24a of each of the drive devices 10 and the ring gear 107 are placed in a freely rotatable state, and thus the nacelle 103 can freely rotate with respect to the tower 102. Such free rotation can effectively prevent a load between each of the meshing portions 24a and the ring gear 107 from becoming excessive, and thus trouble such as a breakage of the various elements constituting each of the drive devices 10 or the ring gear 107 can be avoided before it happens.

As described above, according to the control process flow shown in FIG. 10, the "process intended to eliminate variation in load between the meshing portion 24a and the ring gear 107 among the drive devices 10 (see FIG. 8 and FIG. 9)" and the "process effective in preventing trouble such as a breakage of the various elements constituting each of the drive devices 10 or the ring gear 107 (free yaw control)" can be implemented in a balanced manner.

The present invention is not limited to the above embodiment and variation but may include various aspects modified variously as could be conceived by those skilled in the art, and the effects produced by the present invention are also not limited to those described above. Accordingly, addition, modification, and partial deletion of the elements recited in the claims or described in the specification can be variously made within the technical idea and the purport of the present invention.

For example, while in the above-mentioned control process flow shown in FIG. 10, whether or not to perform free yaw control (see S33 in FIG. 10) is determined based on a result of detection by the state quantity detection portion 80, whether or not to perform free yaw control may also be determined based on any factor other than a result of detection by the state quantity detection portion 80. For example, it is possible that an anemometer (not shown) for measuring a velocity of a wind blowing to the wind turbine 101 is separately provided beforehand, and based on a result of measurement by said anemometer, the controller 110 determines whether or not to perform free yaw control. In this case, for example, when a result of measurement by the anemometer is equal to or more than a predetermined wind velocity threshold value, the controller 110 may determine to perform free yaw control. On the other hand, when a result of measurement by the anemometer is smaller than the predetermined wind velocity threshold value, the controller 110 may determine not to perform free yaw control and perform the process of reducing variation in load between the meshing portion 24a and the ring gear 107, namely, variation in result of detection by the state quantity detection portions 80 (see FIG. 8 and FIG. 9).

LIST OF REFERENCE NUMBERS 5 wind turbine drive system
10 drive device
20 drive device body
21 case
22 flange
22a through hole
23 electric motor
24a meshing portion
24 output shaft
25 speed reducing portion
30 fastener
30a bolt
30b nut
40 sensor
48 motor drive portion
48a drive shaft
49 jig
50 motor braking portion
51 housing
53 electromagnet
53a electromagnetic body
53b coil portion
53c elastic member retaining hole
55 elastic member
56 friction plate
57 armature
58 friction plate
72 cover
77 first friction plate connecting portion
77a spline shaft
77b slide shaft
77c stopper ring
80 state quantity detection portion
101 wind turbine
102 tower
103 nacelle
103a bottom portion
103b through hole
104 rotor
105 blade
106 bearing
107 ring gear
110 controller

What is claimed is:

1. A wind turbine drive system, comprising:
a plurality of drive devices provided in a first structure and including a meshing portion meshing with a ring gear provided in a second structure, the first structure and the second structure being configured to rotate relative to each other, each of the plurality of drive devices including:
a motor drive portion for outputting power;
a speed reducing portion for receiving the power transmitted from the motor drive portion; and
a motor braking portion for braking the motor drive portion;
a state quantity detection unit for detecting, for each of the plurality of drive devices, a load between the meshing portion of the each of the plurality of drive devices and the ring gear; and
a control unit for controlling the motor drive portion, the motor braking portion, or the motor drive portion and the motor braking portion of each of the plurality of drive devices based on the load for the each of the plurality of drive devices detected by the state quantity detection unit, so as to reduce a degree of variation in the load among the plurality of drive devices,
wherein in a state where the motor braking portion of each of the plurality of drive devices is applying a braking force to the corresponding motor drive portion, the control unit reduces the degree of variation in the load among the plurality of drive devices by controlling at least the motor braking portion of a drive device for which the load is largest among the plurality of drive devices to weaken the braking force thereof,
wherein the at least the motor braking portion of the drive device that is configured to be controlled is controlled so as to provide the braking force that is smaller than the braking forces provided by each of the other motor braking portions, and
wherein a predetermined value of the braking force provided by each of the motor braking portions is predetermined, and the braking force is weakened so as to be weaker than the predetermined value.

2. The wind turbine drive system according to claim 1, wherein each of the plurality of drive devices is fixed to the first structure via a fastener, and
wherein the state quantity detection unit is configured to detect the load by measuring an amount of a force acting on the fastener.

3. The wind turbine drive system according to claim 1, wherein the state quantity detection unit is configured to detect the load by measuring an amount of a force acting on the speed reducing portion.

4. The wind turbine drive system according to claim 1, wherein the control unit is configured to determine, based on a magnitude of the load for each of the plurality of drive devices detected by the state quantity detection unit, whether or not to control the motor drive portion, the motor braking portion, or the motor drive portion and the motor braking portion of each of the plurality of drive devices to reduce the degree of variation in the load among the plurality of drive devices.

5. A wind turbine, comprising:
a first structure and a second structure configured to rotate relative to each other;
a ring gear provided in the second structure; and
the wind turbine drive system according to claim 1.

6. The wind turbine drive system according to claim 1, wherein the control unit is configured to control the motor drive portion, the motor braking portion, or the motor drive portion and the motor braking portion of each of the plurality of drive devices to reduce the degree of variation in the load among the plurality of drive devices in a case where the degree of variation in the load among the plurality of drive devices deviates from a permissible range, and
wherein the control unit is configured not to control the motor drive portion, the motor braking portion, or the motor drive portion and the motor braking portion of each of the plurality of drive devices to reduce the degree of variation in the load among the plurality of drive devices in a case where the degree of variation in the load among the plurality of drive devices falls within the permissible range.

7. The wind turbine drive system according to claim 1, wherein the braking force applied to the motor drive portion of the drive device whose load is the largest is weakened so as to facilitate rotation of a drive shaft of the motor drive portion of the drive device whose load is the largest.

8. The wind turbine drive system according to claim 1, wherein the drive shaft of the motor drive portion of the drive device whose load is the largest is configured to slightly rotate so as to reduce a load between the ring gear and the meshing portion of the drive device whose load is the largest, while a load for each of the other drive devices increases, so that the backlash between each of the meshing portions and the ring gear is made uniform in size.

9. The wind turbine drive system according to claim 1, wherein the braking force applied by the motor braking portion of each of the plurality of drive devices to the corresponding motor drive portion is zero.

\* \* \* \* \*